United States Patent [19]

Bennett

[11] Patent Number: 4,704,802
[45] Date of Patent: Nov. 10, 1987

[54] TOOTH PROFILE SENSING INSTRUMENT

[76] Inventor: Therman B. Bennett, 1103 S. State Rte. 42, Lebanon, Ohio 45036

[21] Appl. No.: 835,365

[22] Filed: Mar. 3, 1986

[51] Int. Cl.⁴ .............................................. G01B 5/18
[52] U.S. Cl. .................................. 33/556; 33/172 R; 33/179.5 R; 33/199 R
[58] Field of Search .............. 33/179.5 R, 172 R, 556, 33/519, 169 B, 169 R, 199 R

[56] References Cited

U.S. PATENT DOCUMENTS

| | | | |
|---|---|---|---|
| 1,659,969 | 2/1928 | Baker | 33/172 R |
| 2,560,571 | 7/1951 | Hawkins | 33/172 R |
| 2,572,999 | 10/1951 | Elliott | 33/DIG. 1 |
| 3,911,586 | 10/1975 | Malonda | 33/172 R |
| 4,577,412 | 3/1986 | McKinney | 33/172 R |

Primary Examiner—William D. Martin, Jr.

[57] ABSTRACT

An instrument for sensing the profile of an elongate tooth of a corrugation roll or gear wheel or the like. A carriage supports an axially movable stem which is operably connected to an indicator element. The stem has an engagement portion which engages a tooth of a corrugation roll as the carriage is moved along the roll. The carriage is provided with runners or slide elements which travel within troughs or valleys, which separate the teeth of the corrugation roll. Preferably, a magnet member is attached to the carriage and is positioned adjacent the surface of the corrugation roll and maintains the position of the carriage with respect to the roll as the carriage is moved along the roll.

3 Claims, 6 Drawing Figures

U.S. Patent  Nov. 10, 1987  4,704,802
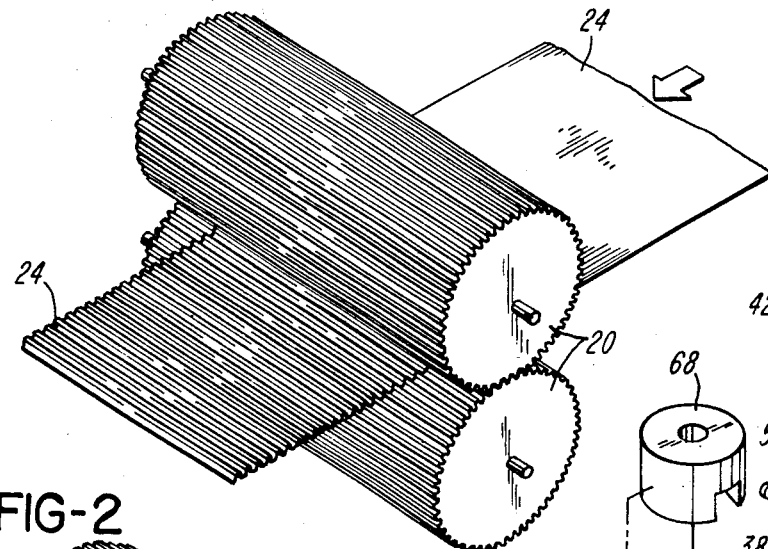
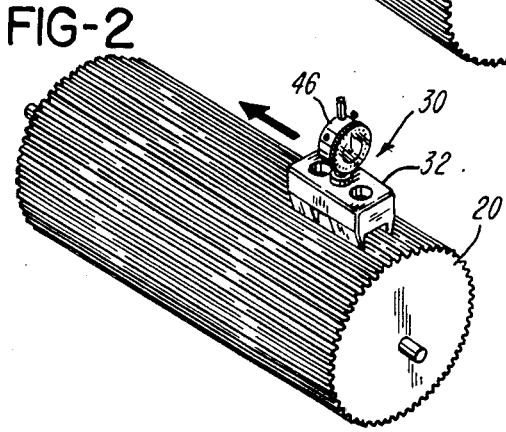
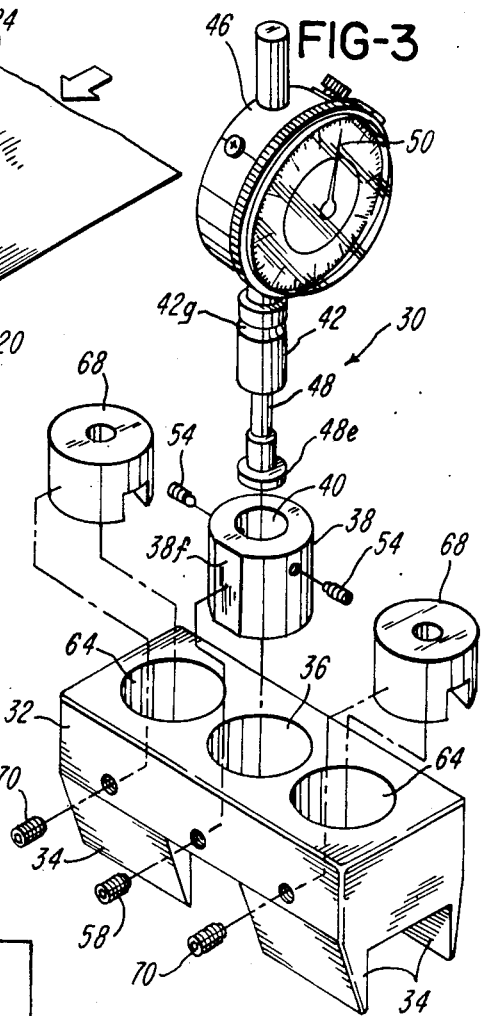
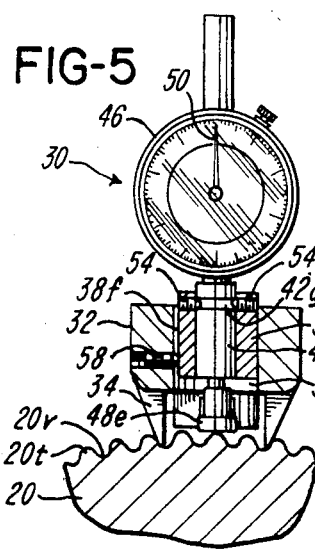
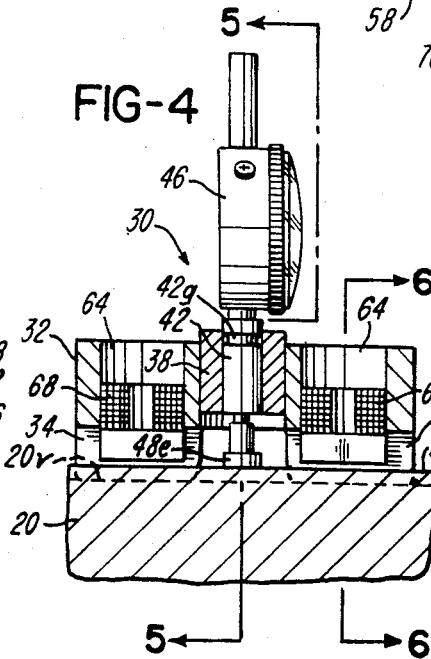
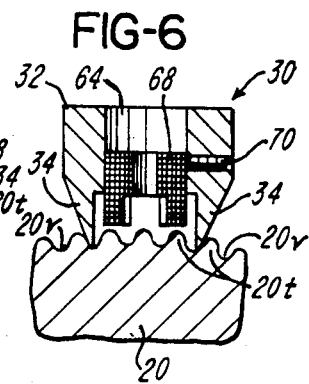

TOOTH PROFILE SENSING INSTRUMENT

BACKGROUND OF THE INVENTION

Numerous devices and instruments have been devised for the purpose of determining the profile of teeth of a corrugation roll or gear wheel or the like. However, such instruments or devices have been of the type which merely measure distance between the top of a tooth and the bottom of a tooth of a corrugation roll. Such devices or instruments have not been readily capable of sensing the profile of teeth of a corrugation roll along the length thereof.

An object of this invention is to provide an instrument which is capable of sensing the profile of teeth of a corrugation roll along the length of the teeth.

Another object of this invention is to provide such an instrument which is relatively small in physical dimensions and which is easily moved along a tooth of a corrugation roll.

Another object of this invention is to provide such an instrument which is capable of a high degree of accuracy.

Another object of this invention is to provide such an instrument which firmly maintains its position with respect to a tooth as the instrument is moved along the tooth for sensing the condition thereof.

Other objects and advantages of this invention reside in the construction of parts, the combination thereof, the method of production and the mode of operation, as will become more apparent from the following description.

SUMMARY OF THE INVENTION

An instrument of this invention comprises a carriage or sled which has a pair of runners or slide elements. The runners or slide elements are adapted to be positioned within spaced-apart troughs or valleys. Each trough or valley separates a pair of adjacent teeth of a corrugation roll. The two runners or slide elements are positioned within two troughs or valleys, with one or more teeth between the two troughs or valleys.

The carriage or sled supports an axially movable stem which is substantially normal to the runners and which has an engagement element at the end thereof. The stem is supported within the carriage or sled, and the engagement element of the stem engages the upper surface of a tooth and is adapted to move along the tooth to sense the profile of the tooth as the stem moves upwardly and downwardly as the stem moves along the tooth. The stem is operably joined to an indicator element which is movable within a housing in accordance with axial movement of the stem.

Preferably, magnetic elements are mounted upon the sled or carriage and are adapted to be in juxtaposition with a tooth or teeth to firmly maintain the sled or carriage in proper position with respect to the teeth and valleys of the corrugation roll during movement of the sled and stem along a tooth.

BRIEF DESCRIPTION OF THE VIEWS OF THE DRAWING

FIG. 1 is a perspective view showing a pair of corrugation rolls and illustrating the movement of a sheet between the rolls for corrugation thereof.

FIG. 2 is a perspective view showing one of the corrugation rolls and illustrating movement of an instrument of this invention along the roll to determine the profile of a tooth of the corrugation roll.

FIG. 3 is a greatly enlarged exploded perspective view showing a tooth profile sensing instrument of this invention.

FIG. 4 is a side sectional view, drawn on substantially the same scale as FIG. 3 and showing a tooth engaged by the instrument for sensing the profile thereof.

FIG. 5 is a sectional view taken substantially on line 5—5 of FIG. 4.

FIG. 6 is a sectional view taken substantially on line 6—6 of FIG. 4.

DETAILED DESCRIPTION OF THE INVENTION

FIG. 1 shows a pair of closely spaced parallel corrugation rolls 20, as the rolls 20 rotate together and corrugate a sheet 24 which travels between the rolls 20. A tooth profile sensing instrument 30 of this invention comprises a carriage or sled 32 which is provided with slide elements or runners 34 at opposite sides thereof.

At the central portion of the sled 32 is an opening 36, within which a sleeve 38 is positioned. The sleeve 38 is generally cylindrical. The sleeve 38 has a flat surface 38f. The sleeve 38 has an opening 40 therethrough within which a collar 42 is mounted. The collar 42 has an annular peripheral groove 42g. A housing 46 is mounted upon the collar 42 and is attached thereto. A stem 48 axially extends through the collar 42 and is axially movable with respect to the collar 42 and with respect to the housing 46. Within the housing 46 is mechanism, not shown, which is connected to the stem 48 and to an indicator hand 50 which is rotatably mounted within the housing 46. The stem 48 has an engagement portion 48e at the end thereof.

The collar 42 is positioned within the opening 40 of the sleeve 38. Screws 54 are mounted within the sleeve 38 and extend into the groove 42g of the collar 42. Thus, the collar 42 is rotatable within the opening 40 of the sleeve 38, as the collar 42 is retained by the sleeve 38.

The sleeve 38 is positioned within the opening 36 in the sled 32, and a screw 58 which is mounted within the sled 32 engages the flat surface 38f of the sleeve 38 and retains the sleeve 38 within the sled 32.

The carriage or sled 32 also has a pair of openings 64. Within each opening 64 is a magnet 68. Set screws 70, mounted within the carriage 32, engage the magnets 68 and retain the magnets 68 within the openings 64.

OPERATION

A tooth profile sensing instrument 30 of this invention is positioned upon a corrugation roll 20 as illustrated in FIG. 2. The corrugation roll is ordinarily constructed of any suitable metallic material. The slide elements or runners 34 of the sled 32 are positioned within troughs or valleys 20v of the roll 20. Each of the troughs or valleys 20v separates a pair of teeth 20t, as best illustrated in FIGS. 5 and 6. In the position of the carriage 32, shown in FIGS. 5 and 6 the engagement portion 48e of the stem 48 engages the upper surface of a tooth 20t. In this position of the carriage or sled 32, the magnets 68 are in juxtaposition with teeth 20t and are attracted to the surface of the corrugation roll 20 and urge the sled or carriage 32 toward the teeth 20t. Thus, the sled or carriage 32 is firmly maintained with respect to the teeth 20t and the corrugation roll 20.

Then the sled or carriage 32 is slidably moved along the troughs or valleys 20v, as illustrated in FIG. 2. As this sliding movement of the sled 32 occurs the engagement portion 48e of the stem 48 remains in engagement with the tooth 20t and the engagement portion 48e moves upwardly and downwardly in accordance with the profile of the tooth 20t engaged by the engagement portion 48e of the stem 48. As the engagement portion 48e moves upwardly and downwardly, as the carriage 32 moves along the corrugation roll 20, the stem 48 is moved axially upwardly and downwardly. Thus, the indicator hand 50 moves in accordance with the upward and downward movement of the engagement portion 48e of the stem 48. Therefore, an observer of the indicator hand 50 is able to determine the profile of the tooth 20t which is engaged by the engagement portion 48e of the stem 48.

As a result of the means by which the collar 42 is attached to the sleeve 38, the housing 46, with the collar 42, is rotatable and permits the housing 46 to be best rotatably positioned for observation of the indicator hand 50.

After the profile of a tooth 20t is observed, the sled or carriage 32 is moved to another position upon the corrugation roll 20 for sensing the profile of another tooth 20t.

Thus, it is understood that a tooth profile sensing instrument 30 of this invention provides means by which the profile of a tooth of a corrugation roll or gear wheel or the like can be easily and readily obtained.

Although the preferred embodiment of the tooth profile sensing instrument of this invention has been described, it will be understood that within the purview of this invention various changes may be made in the form, details, proportion and arrangment of parts, the combination thereof, and the mode of use, which generally stated consist in a tooth profile sensing instrument within the scope of the appended claims.

The invention having thus been described, the following is claimed:

1. A tooth profile sensing instrument for an elongate toothed corrugation roll having a peripheral surface portion made of magnetically attractable material and provided with elongate teeth in which each tooth is formed by a piar of valleys, the corrugation roll being adapted to operate in meshed relationship with another corrugation roll, as the two corrugation rolls rotate and corrugate strip material which moves between the corrugation rolls, comprising:

a sled, the sled including an elongate body, a pair of parallel spaced-apart elongate slide runners attached to the elongate body and extending therefrom, the elongate slide runners establishing a pair of substantially parallel planes extending downwardly from the elongate body, the elongate slide runners being adapted to be positioned within spaced-apart valleys of a toothed corrugation roll, the elongate body of the sled being provided with a first opening therein which is positioned between the pair of slide runners, an annular sleeve fixedly positioned within the first opening and attached to the elongate body of the sled, a collar positioned within the sleeve and attached to the sleeve and rotatable with respect to the sleeve, a housing attached to the collar, a stem mounted within the collar and axially movable within the collar along a line substantially parallel to the planes of the slide runners, the stem having an engagement portion engageable with a tooth of a toothed roll as the slide runners are positioned within spaced-apart valleys of the toothed roll, an indicator member carried by the housing and operably joined to the stem for operation in accordance with axial movement of the stem, the elongate body of the sled also having a second opening therein between the slide runners, a magnet within the second opening and attached to elongate body of the sled and extending downwardly therefrom, wherein the sled is slidably movable along the elongate roll as the elongate slide runners are positioned within spaced-apart valleys of the elongate roll and as the elongate slide runners slide along the valleys and within the valleys, and wherein the magnet is attracted toward the magnetically attractable surface portion of the toothed roll and urges the sled toward the surface portion of the toothed roll, and as the engagement portion of the stem engages a tooth shich is positioned between the valleys and as the engagement portion of the stem slides along the tooth, as the profile of the tooth is sensed with axial movement of the stem as indicated by the indicator member.

2. The tooth profile sensing instrument of claim 1 in which elongate body of the sled has a third opening, the first and second and third openings being in alignment, with the first opening between the second opening and the third opening, and a second magnet, the second magnet being within the third opening and attached to elongate body of the sled and extending downwardly therefrom.

3. A tooth profile sensing instrument for an elongate toothed corrugation roll provided with elongate teeth in which each tooth is formed by a pair of valleys, the corrugation roll being adapted to operate in meshed relationship with another corrugation roll, as the two corrugation rolls rotate and corrugate strip material which moves between the corrugation rolls, comprising:

a sled including a rigid body, a pair of spaced-apart elongate slide runners extending from the rigid body and establishing a pair of substantially parallel planes, the elongate slide runners being adapted to be positioned within spaced-apart valleys of a toothed corrugation roll, the rigid body of the sled being provided with an annular sleeve positioned between the slide runners of the rigid body of the sled, an annular collar positioned within the annular sleeve and attached to the sleeve for rotation with respect to the sleeve, a housing attached to the collar, a stem positioned within the collar and extending through the collar, the stem being substantially parallel to the planes of the slide runners, the stem being axially movable within the collar, the stem having an engagement portion engageable with a tooth of toothed corrugation roll as the elongate slide runners are positioned within spaced-apart valleys of the toothed corrugation roll, an indicator member carried by the housing and operably joined to the stem for operation in accordance with axial movement of the stem, wherein the sled is movable along the elongate toothed corrugation roll as the elongate slide runners are slidably positioned within spaced-apart valleys of an elongate toothed corrugation roll and as the engagement portion of the stem engages a tooth which is positioned between the spaced-apart valleys and as the engagement portion of the stem slides along the tooth, as the profile of the tooth which is engaged by the engagement portion of the stem is sensed with axial movement of the stem, as indicated by the indicator member as the elongate slide runners of the sled slide within the valleys.

* * * * *